(No Model.)

R. D. GALLAGHER, Jr.
MEANS FOR TRANSMITTING THE POWER OF A MOVING CAR TO A MOTOR THEREON.

No. 511,520. Patented Dec. 26, 1893.

Witnesses
R. H. White.
Jno. A. Christianson.

Inventor
Richard D. Gallagher, Jr.
By his Attorneys,
Dyrenforth & Dyrenforth,

UNITED STATES PATENT OFFICE.

RICHARD D. GALLAGHER, JR., OF CHICAGO, ILLINOIS.

MEANS FOR TRANSMITTING THE POWER OF A MOVING CAR TO A MOTOR THEREON.

SPECIFICATION forming part of Letters Patent No. 511,520, dated December 26, 1893.

Application filed January 28, 1893. Serial No. 459,968. (No model.)

*To all whom it may concern:*

Be it known that I, RICHARD D. GALLAGHER, Jr., a citizen of the United States, residing at Chicago, in the county of Cook and State of Illinois, have invented a new and useful Improvement in Means for Transmitting the Power of a Moving Car to a Motor Thereon, of which the following is a specification.

My invention relates to an improvement in the means employed on a car for utilizing the power of a rotating axle thereof through the medium of a suitable primary motor connected with the axle, and transmitting the power by the primary motor to a secondary motor on the car, the power of which is employed for useful purposes, such as driving a dynamo for lighting the car or cars by electricity, fans for ventilating purposes, and the like.

My primary object is to provide simple and effective means for transmitting the power from the primary to the secondary motor, whereby the mechanism shall not be injuriously or undesirably affected, or disorganized, by the vibrations of the car-body in motion.

Figure 1:
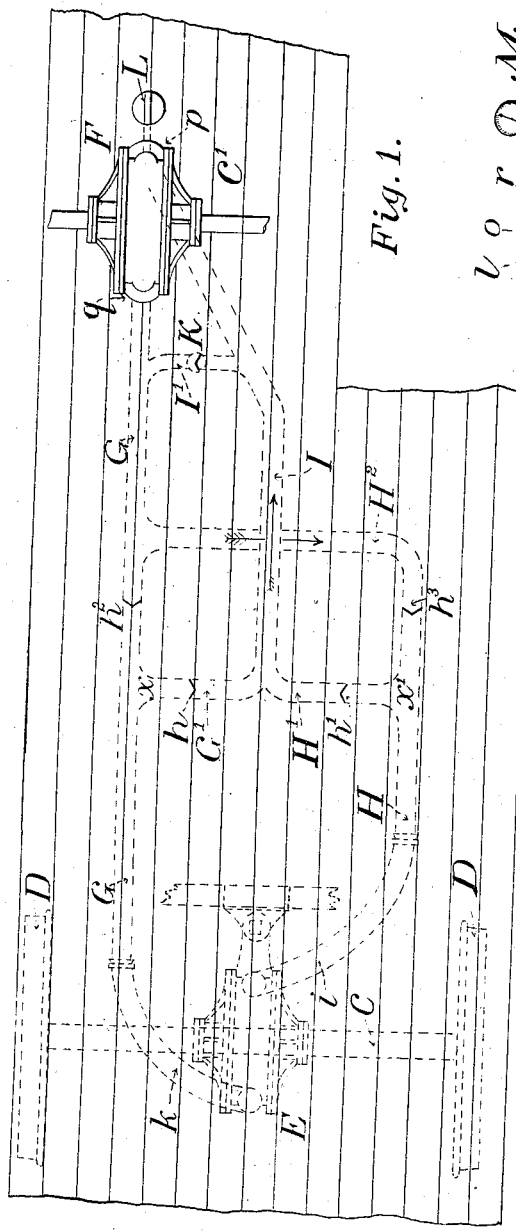
Figure 2:
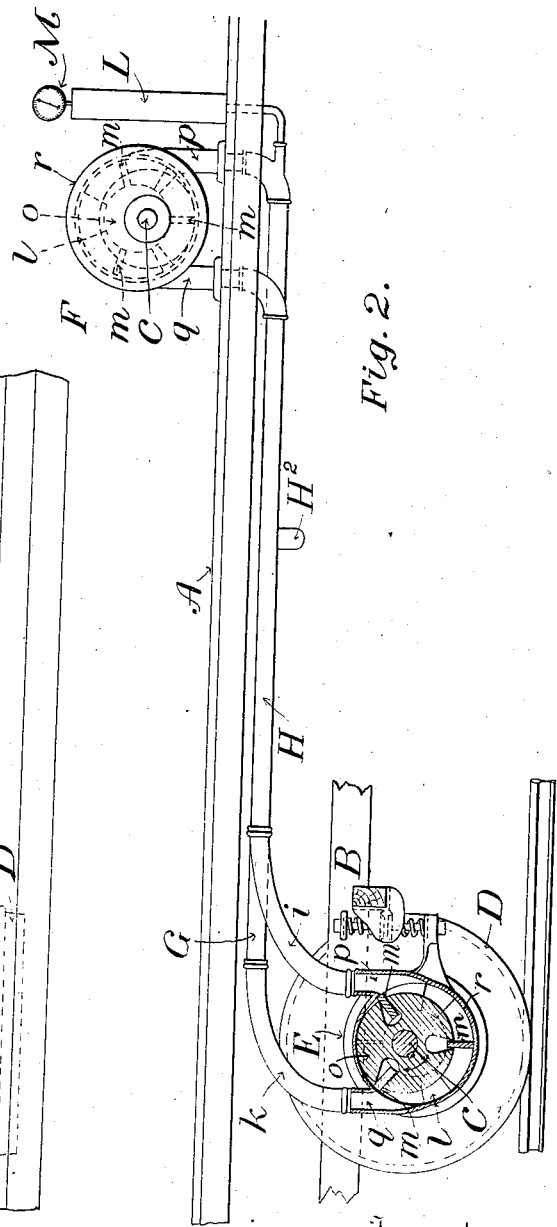

In the accompanying drawings, Figure 1 is a broken plan view, in the nature of a diagram, of my improvement; and Fig. 2 is a broken longitudinal section of the same.

A represents the floor of a car, and B denotes a truck-frame supporting the axle C for the car-wheels D. The parts thus referred to may involve any suitable or well known construction, and need not, therefore, be herein described in detail.

E is a pump, which I prefer to support directly on the axle C, though it may be elsewhere supported on the car and connected with the axle by means of suitable gearing; and F is a motor supported in suitable position on the car (as on the floor A), and connected with the pump E by pipe-connections hereinafter described.

The pump E and motor F may involve the same construction, and this may be of any form suitable for my purpose; and I do not intend to limit my improvement to any particular construction of the pump and motor, though that illustrated is novel, but is not herein described in detail, as it forms the subject of my separate concurrent application for Letters Patent, Serial No. 459,969, filed on the 28th day of January, 1893.

For my present purpose it will be sufficient to describe the pump E as involving a circular casing $r$ stationarily supported to surround the axle C, but eccentrically thereto, having an outlet $q$ and an inlet $p$ at different points in its periphery; a circular head $o$ within the casing secured on the axle concentrically and to rotate therewith and having radial recesses $n$ at suitable intervals, in which operate abutments or vanes $m$ confined between a pair of annular abutment-guides $l$ (one of which, only, is shown in Fig. 2), which surround the axle C eccentrically thereof, but are concentric with the casing $r$. The motor F, illustrated, which has a driving-shaft C' may involve identically the same construction as the pump E, and the corresponding parts of the motor are denoted by the same reference letters as those employed to denote the parts of the pump.

Flexible pipe-sections $k$ and $i$ (preferably rubber hose) are connected with the pump E, respectively, at the outlet $q$ and inlet $p$, and lead to solid pipes G and H, supported on the bottom of the car, and through which fluid is forced from the pump to the motor and back to the pump, for driving the motor. I provide a peculiar arrangement of transmitting-pipes G and H and of check-valves therein, of which the following is a description: At $x$ and $x'$, respectively, the pipes G and H lead, by branches G' and H', into a common pipe I, which leads to the inlet $p$ of the motor F. From the point $x$ the pipe G continues to the outlet $q$ of the motor F. H² is an extension of the pipe H, which crosses over, beyond the point $x'$, to the pipe G beyond the point $x;$ and the pipes I and II are connected, near the motor F, by a by-pass I', which contains a pressure-regulating valve K, of any desired construction.

L is an air-chamber connected with the supply-pipe I of the motor to act as a governor for the purpose of taking up any throbbing of the pump E; and the air-chamber is surmounted by a gage M, inspection of which shows the pressure at which the fluid is circulating and enables it to be properly regulated.

In the branch G' is an inwardly opening check-valve, indicated at $h$, and another inwardly opening check-valve is provided in the branch H', as indicated at $h'$. In the pipe G, between the point $x$ therein and the pipe-extension $II^2$, is a check-valve, indicated at $h^2$, which opens toward the point $x$; and in the extension $II^2$ of the pipe II is a check-valve, indicated at $h^3$, which opens correspondingly with the check-valve $h^2$.

The operation is as follows: The construction illustrated provides, as will be seen, an endless course for the power-transmitting fluid to be employed, which may be air, gas, or a suitable liquid, which, preparatory to operating the mechanism, is supplied in sufficient quantity to fill the pump and motor and pipe-connections between them. Rotation of the axle C in the direction of the arrow, as indicated in Fig. 2, will then force the fluid through the pipe G, branch G', pipe I and inlet $p$ into the motor F, thereby driving the latter, and transmitting its power, through the shaft C' to the dynamo or other device (not shown) to be driven. The exhaust from the motor F passes through the pipe G, extension $II^2$ and pipe II back to the pump E. Should the speed of the car be increased to an extent that would increase the head under which the motor is operated to an undesired degree, the excess of the head of fluid will cause the valve K to open sufficiently to allow a proper portion of the fluid to pass by the motor, instead of passing through it, which would cause it to speed up; and such excess enters the pipe G and passes with the exhaust back to the pump. By my arrangement of check-valves, as will be seen, the pump E may be caused to revolve in either direction without changing the direction of revolution of the motor. Thus if the axle C be caused to revolve in the direction which would force the power-transmitting fluid through the pipe II, (thereby rendering $q$ the pump-inlet,) the fluid will reach the pipe I by passing the check-valve $h'$, and thus enter the motor also at its inlet $p$, the by-pass I' taking any excess there may be; and, owing to the pressure against the check-valve $h^3$, the course of the exhaust will be through the pipe G directly to the pump at $q$, which will then be the pump-inlet. The arrangement of check-valves also serves to relieve the machinery from strain that would otherwise result from sudden stopping of the car; for should the pump E suddenly stop, the motor F, instead of stopping immediately, acts for a time as a pump to pump the fluid through the pipes and valves.

One of the more important uses, for which my improvement is intended, is that of charging, through the medium of a dynamo hereinbefore referred to, storage-batteries, now commonly carried on cars to take up the excess of energy during the time the motor is caused to run when no light or other power is required, and give it off again when the car is stopped, as at a station, or when the train is broken apart.

It is not essential to my invention, though preferred, that the exhaust from the motor shall lead back to the pump.

What I claim as new, and desire to secure by Letters Patent, is—

1. In combination with a car, a fluid-pump connected with a car-axle and operated by the rotation of the axle by the motion of the car, a motor supported on the car for driving mechanism thereon, fluid-conducting pipe-connections between the pump and motor for transmitting driving-power of the axle, through the medium of the said pump thereon, to the motor and exhausting the fluid from the motor, and check-valve and governing mechanism controlling the direction and pressure of the fluid in the pipes and operating to maintain and control the speed and direction of the motor on the car regardless of the speed and direction of the pump on the axle substantially as described.

2. In combination with a car, a pump connected with a car-axle, a motor supported on the car for driving mechanism thereon, fluid-conducting pipes G and H leading from the pump and branching beyond it into a common pipe I leading to the motor-inlet, the pipe G extending to the motor-outlet and the pipe II to the pipe G beyond the said branching, and a system of check-valves in the said pipes operating, at will, to conduct the outgoing fluid from the pump either through the pipe G or the pipe H to the motor-inlet $p$ through the pipe I, and to conduct the exhaust back to the pump, accordingly, either through the pipe II or the pipe G, substantially as described.

3. In combination with a car, a pump connected with a car-axle, a motor supported on the car for driving mechanism thereon, fluid-conducting pipes G and II leading from the pump and branching beyond it into a common pipe I leading to the motor-inlet, the pipe G extending to the motor-outlet and the pipe II to the pipe G beyond the said branching, a system of check-valves in the said pipes operating, at will, to conduct the outgoing fluid from the pump either through the pipe G or pipe II to the motor-inlet $p$ through the pipe I, and to conduct the exhaust back to the pump accordingly, either through the pipe II or pipe G, and a by-pass I' between the pipes I and II, and containing a pressure-valve K, substantially as described.

4. In combination with a car, a pump connected with a car-axle, a motor supported on the car for driving mechanism thereon, fluid-conducting pipes G and II having flexible sections $k$ and $i$ and leading from the pump and to branches G' and II' containing check-valves $h$ and $h'$, a pipe I common to the said branches and leading to the motor-inlet $p$, the said pipe G extending to the motor-outlet $q$ and containing a check-valve $h^2$, the pipe H extending to the pipe G and containing a check-valve $h^3$, a by-pass I' between the pipes I and G and containing a pressure-valve K, and an air-chamber L provided with a gage M and forming a governor, the whole being constructed and arranged to operate substantially as described.

RICHARD D. GALLAGHER, Jr.

In presence of—
J. N. HANSON,
W. N. WILLIAMS.